United States Patent [19]
Leijon et al.

[11] Patent Number: 5,967,961
[45] Date of Patent: Oct. 19, 1999

[54] WELDING UNIT AND BAG-MAKING MACHINE WITH SUCH A WELDING UNIT

[75] Inventors: Thomas Leijon, Ystad; Kenneth Vinberg, Sövde, both of Sweden

[73] Assignee: FAS Converting Machinery AB, Ystad, Sweden

[21] Appl. No.: 09/061,862

[22] Filed: Apr. 17, 1998

[30] Foreign Application Priority Data

May 2, 1997 [SE] Sweden .................................. 9701680

[51] Int. Cl.⁶ ...................................................... B31B 1/64
[52] U.S. Cl. ............................ 493/205; 493/206; 493/208
[58] Field of Search .................................. 493/205, 206, 493/207, 208, 193; 156/583.5; 53/451, 551, 550, 548

[56] References Cited

U.S. PATENT DOCUMENTS

| | | | |
|---|---|---|---|
| 3,775,225 | 11/1973 | Schott, Jr. ................................. | 156/510 |
| 3,797,368 | 3/1974 | Martelli .......................................... | 93/8 |
| 3,908,811 | 9/1975 | Cortese et al. ............................. | 198/16 |
| 3,988,184 | 10/1976 | Howard ...................................... | 156/66 |
| 4,947,618 | 8/1990 | Schneider et al. ......................... | 53/373 |
| 4,950,217 | 8/1990 | Stenqvist .................................. | 493/197 |
| 5,378,302 | 1/1995 | Meister .................................... | 156/497 |
| 5,518,490 | 5/1996 | Ziegelhoffer ............................ | 493/193 |
| 5,676,513 | 10/1997 | Bingham ................................. | 414/24.5 |

FOREIGN PATENT DOCUMENTS

| | | |
|---|---|---|
| 0537127A1 | 4/1993 | European Pat. Off. . |
| 0779146A1 | 6/1997 | European Pat. Off. . |
| 2224407 | 5/1973 | Germany . |
| 1389746 | 4/1975 | United Kingdom . |

*Primary Examiner*—Joseph J. Hail, III
*Assistant Examiner*—William Hong
*Attorney, Agent, or Firm*—Smith, Gambrell & Russell, LLP; Beveridge, DeGrandi, Weilacher & Young Intellectual Property Group

[57] ABSTRACT

A welding unit for forming defining weld lines in an elongate web, preferably in a bag-making machine, includes a drive means, which is arranged in an endless loop, and at least one sealing jaw. The sealing jaw is connected to the drive means for movement along said loop. A fixed guide means extends in an endless loop essentially in parallel with the drive means. Each sealing jaw is received on a carriage, which is connected to the drive means and has at least one follower element, which is adapted to abut against and move along the guide means.

14 Claims, 4 Drawing Sheets

WELDING UNIT AND BAG-MAKING MACHINE WITH SUCH A WELDING UNIT

FIELD OF THE INVENTION

The present invention relates generally to the welding of webs, and more specifically the invention concerns a welding unit for forming defining weld lines in a web, preferably a web for making plastic bags. The invention also concerns a bag-making machine with such a welding unit.

BACKGROUND ART

The invention starts from machines to which a continuous web is fed to be provided with weld or seal lines at a welding or sealing station and, at a possible perforation station, be provided with transverse perforation lines. Such a machine, which is intended for making plastic bags, is disclosed in, for instance, U.S. Pat. No. 4,950,217.

The welding station in this bag-making machine comprises two opposite, transverse welding units, between which the continuous web travels. Each welding unit comprises at least one welding or sealing jaw, which is driven to circulate in an endless loop via a drive means in the form of a chain transmission. The drive means of the opposite welding units are so synchronized that the sealing jaws during their movement are made to abut against each other while clamping the web traveling through the machine. This clamping is provided by the sealing jaws during their circulating movement passing from a curved portion of the loop to a straight portion. After the abutment, the sealing jaws move along the straight portion in the feeding direction of the web while abutting against each other, to form weld lines in the web. The distance along which the sealing jaws abut against each other is the so-called welding distance.

In the construction above, the drive means consist of chains. The chain transmission results in undesired noise levels and places demands on maintenance, such as lubrication. The lubrication may result in dirt and oil splashes depositing in the machine.

In a bag-making machine as stated above, the speed of the sealing jaws should also be adjusted to the speed of the web along the entire welding distance. The driving chains are normally designed in such a manner that the speed of the sealing jaws along the straight portion corresponds to the speed of the web through the machine. Here problems may arise when the sealing jaws are made to abut against each other, since this abutment takes place before the straight portion, i.e. when the sealing jaws move along a portion in the form of a circular arc and thus have a higher peripheral speed than the web. The abutment of the sealing jaws produces a jerk in the web, which runs the risk of being torn off. This problem can be obviated by the speeds of the drive means being lowered momentarily during abutting of the sealing jaws. However, this solution makes great demands on drive and transmission, and therefore the construction will be both complicated and costly.

In attempts at solving the above-mentioned problem, belt operation has been used, in which a sealing jaw is fixed directly to a rubber block which is fixed by vulcanization to a driving belt. However, it has been found that the rubber block was subjected to great torsional forces while the sealing jaw moved along a circular arc. These torsional forces were so great that gradually the rubber block was broken away from the driving belt.

SUMMARY OF THE INVENTION

An object of the present invention is to wholly or partly overcome the above problems of prior art.

According to the invention, this and other objects, which will appear from the following specification, are now achieved by a welding unit for forming weld lines in an elongate web, comprising: a drive means which is arranged in an endless loop; at least one sealing jaw which is connected to the drive means for movement along the loop; a guide means extending in an endless loop essentially in parallel with the drive means; and at least one carriage which is connected to the drive means and has at least one follower element, which is adapted to abut against and move along the guide means; each carriage supporting a sealing jaw.

The objects are also achieved by a bag-making machine for forming weld lines in an elongate web, comprising: at least two opposite and cooperating welding units, each of which including a drive means which is arranged in an endless loop; at least one sealing jaw which is connected to the drive means for movement along the loop; a guide means extending in an endless loop essentially in parallel with the drive means; and at least one carriage which is connected to the drive means and has at least one follower element, which is adapted to abut against and move along the guide means; each carriage supporting a sealing jaw.

The inventive construction permits the use of driving belts instead of chains since the carriage and the guide means will absorb the greater part of the forces arising during the circulating movement of the sealing jaw. These forces will thus not be transferred to the drive means, for instance, an endless driving belt.

The use of driving belts yields transmission without necessitating lubrication. Thanks to the non-existence of heavy chains, the inventive construction also has less inertia, thereby facilitating the use of servomotors. Such a servomotor-controlled welding unit is easier to control and runs more silently than traditional constructions.

According to a preferred embodiment, each carriage has two follower elements which are fixed to the carriage at two fixing points, between which the sealing jaw is arranged. Thus the distance of the sealing jaw from the drive means will be smaller as the sealing jaw moves along a portion in the form of a circular arc than in the case where it moves along a straight portion. With a suitable distance between the fixing points of the follower elements in the respective carriages, two opposite sealing jaws can thus be made to abut against each other along the straight portion. Consequently, the speeds of the sealing jaws and the web are adjusted to each other during the abutment and over the entire welding distance. The abutment of the sealing jaws takes place softly since the distance of the sealing jaws from the drive means gradually increases when passing from the portion in the form of a circular arc to the straight portion, i.e. during the abutment.

BRIEF DESCRIPTION OF THE DRAWINGS

The invention and its advantages will be described in more detail below with reference to the accompanying schematic drawings, which for the purpose of exemplification illustrate presently preferred embodiments.

DESCRIPTION OF PREFERRED EMBODIMENTS

Figure 1:
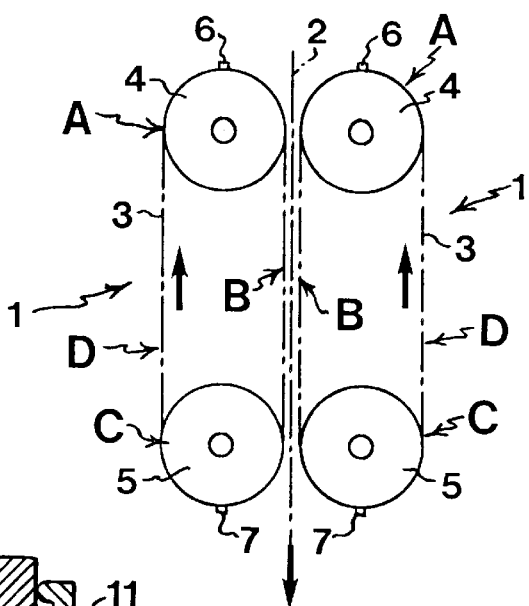
FIG. 1 is a basic sketch of a welding station in a bag-making machine.

FIG. 1 shows a basic sketch of a welding or sealing station in, for instance, a bag-making machine. Two welding or sealing units 1 are arranged opposite each other. A web 2, preferably a flattened plastic film tube, is fed continuously or intermittently between the welding units 1 by means of a roll arrangement (not shown). Each welding unit 1 comprises an endless drive means 3, preferably a driving belt, alternatively a chain. The drive means 3 is arranged on two rotatable drive wheels 4, 5. Each driving belt 3 supports two transverse welding or sealing jaws 6, 7, which are known per se and contain electric conductors which produce bag-defining weld or seal lines in the web 2.

In each welding unit 1, the sealing jaws 6, 7 are made, via the drive wheels 4, 5, to move in a loop, which consists of an upper portion A in the form of a circular arc, an intermediate straight portion B, a lower portion C in the form of a circular arc, and an intermediate straight portion D. The directions of travel of the driving belt 3 and the web 2 are indicated by arrows. The opposite welding units 1 are so synchronized that the sealing jaws 6, 7 are made to abut against each other along the opposite straight portions B. The speed of the sealing jaws 6, 7 along the straight portion B is adjusted to the speed of the web 2 through the machine.

The inventive construction will be described in more detail in connection with FIG. 2, which shows part of a welding unit 1. A driver 8 in the form of a block is fixed, preferably by vulcanization, to the smooth outside of the endless driving belt 3. A fixedly arranged guiding groove 9 extends in parallel with the driving belt 3. The guiding groove 9 thus extends along and at a given distance from the driving belt 3.

The sealing jaw 6 is received in a carriage 10, which consists of a holder 11 for the sealing jaw 6, a body 12 connected to the holder 11, two spindles 13, 14 extending through recesses 15, 16 in the ends of the body 12, and two slide bearings 17, 18 which at a respective fixing point are each connected to a spindle 13, 14. The slide bearings 17, 18 are designed as blocks, which are received in the guiding groove 9 and are designed to follow this. As such, each of the slide bearings 17 and 18 is a follower element, acting as a contact which abuts and moves along the guiding groove 9. For optimum guiding, the slide bearings 17, 18 should be turnably mounted on the carriage 10.

The driver 8 has a through hole 19 for receiving one of the spindles 14. Thus, the driving belt 3 is connected to the sealing jaw 6 by the spindle 14, which in the traveling direction is the front spindle, of the carriage 10 extending through the body 12 and the driver 8.

Figure 2:
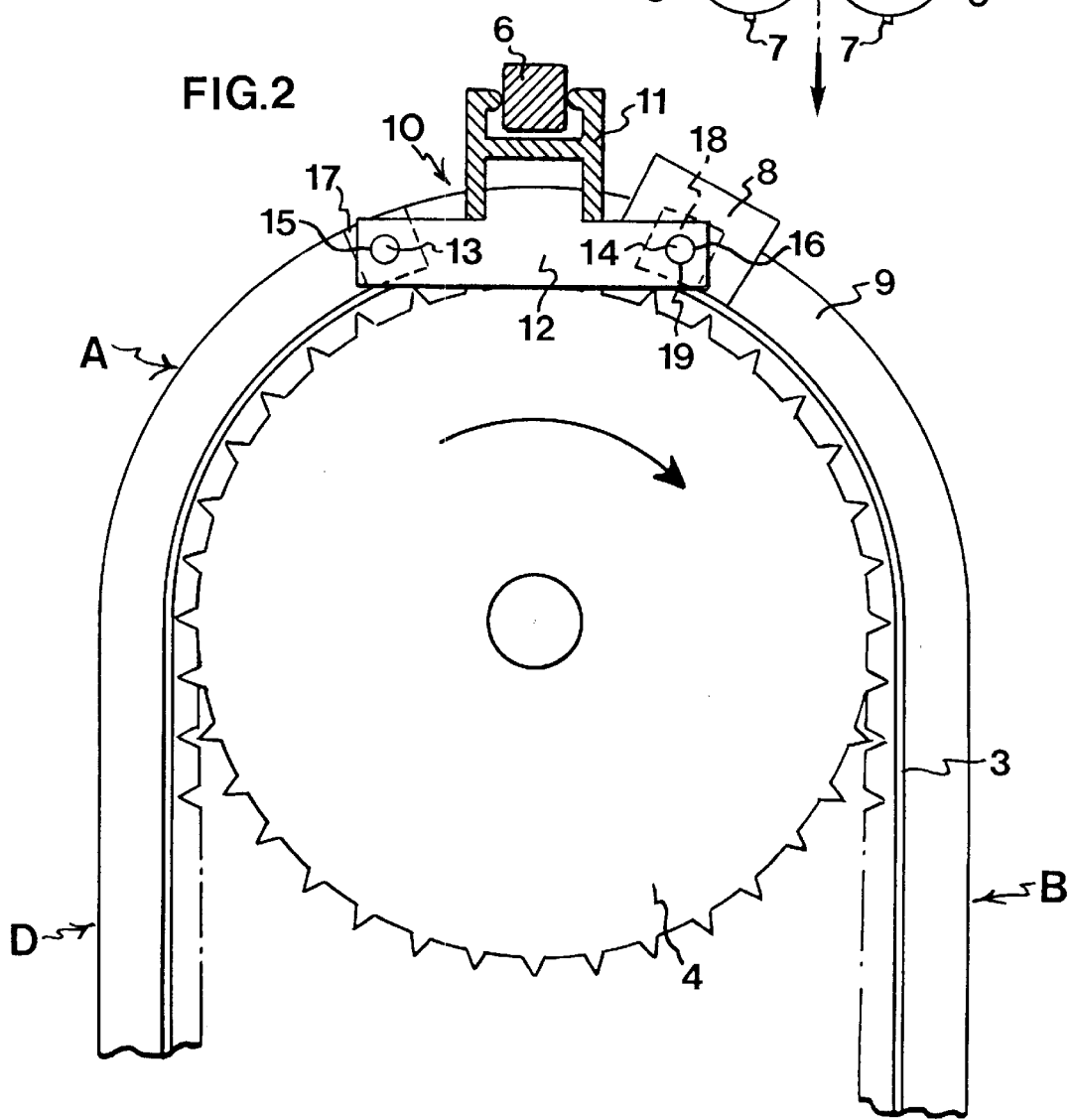
FIG. 2 is a schematic side view of part of an inventive welding unit, some parts being shown in cross-section.

As appears from FIG. 2, the distance of the sealing jaw 6 from the driving belt 3 is smaller along the portion A in the form of a circular arc than along the straight portions B, D. With a suitable distance between the slide bearings 17, 18 of the carriage 10 and between the opposite welding units 1 (FIG. 1) of the welding station, the sealing jaws 6 of two opposite welding units 1 will thus be made to abut against each other along the straight portion B. Consequently, the sealing jaws 6 and the web 2 have the same speed over the entire welding distance. The abutment of the sealing jaws 6 will occur softly since their distance from the driving belts 3 gradually increases when passing from the portions A in the form of circular arcs to the straight portions B.

Thanks to the sealing jaw 6 being connected to the driving belt 3 via the carriage 10 received in the guiding groove 9, the coupling between the carriage and the driving belt will not be subjected to great stress and can therefore be designed in an optional manner. The carriage 10 and the guiding groove 9 will absorb the major part of the forces arising during the movement of the sealing jaw 6.

Figure 3:
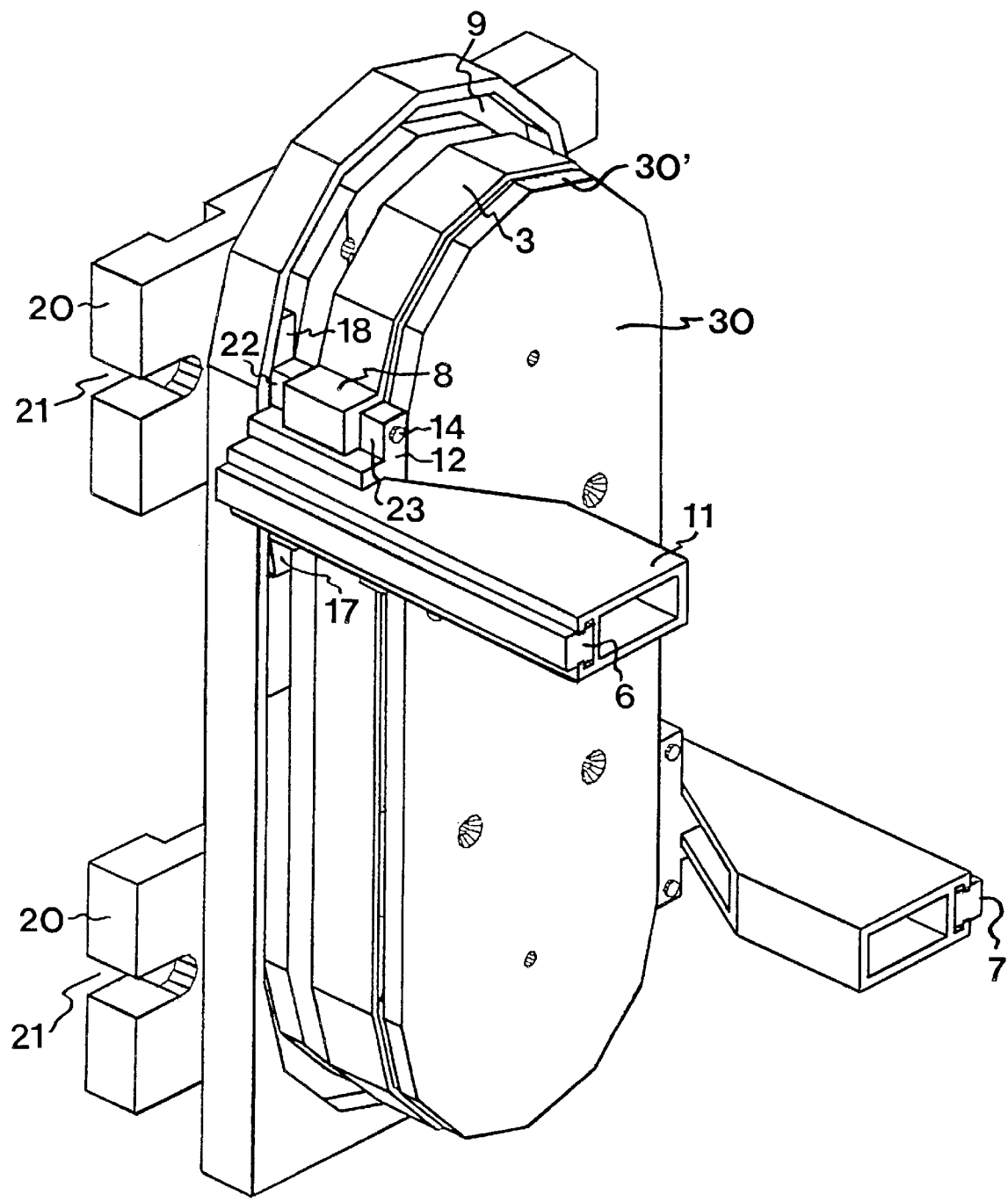
FIG. 3 is a perspective view of one end of the inventive welding unit.

FIG. 3 is a perspective view of an end of an inventive welding unit, which can be detachably mounted in, for instance, a bag-making machine. To this end, the welding unit comprises fixing plates 20 with recesses 21 for receiving fixing screws. The opposite end (not shown) of the welding unit is designed correspondingly. The welding unit has a plate 30 covering the drive wheels 4, 5 shown in FIG. 1. The body 12 of the carriage 10 is guided by the peripheral edge surface 30' of the plate 30.

In the embodiment according to FIG. 3, the driver 8 is received between two projections 22, 23 of the body 12 of the carriage 10. It may also be noted that the driver 8 is fixed to the carriage 10 on the pulling side thereof such that the driver 8 abuts against the carriage 10 during great parts of the endless loop. Such mounting is preferred since frictional resistance, for instance between the slide bearings 17, 18 and the guiding groove 9, subjects the driver 8 to undesired torsional forces. These torsional forces are counteracted when the driver 8 abuts against the pulling side of the carriage 10.

For optimum balance, the sealing jaw 6 is preferably arranged in the center plane of the carriage 10. For a given distance between the slide bearings 17, 18, this arrangement also yields the greatest possible change in distance in the radial direction along the portions A, C in the form of circular arcs.

Alternative embodiments are feasible with in the scope of the invention. For example, rolls can be used instead of slide bearings. Since these rolls, which are freely rotatably mounted on the spindles, roll against the inside of the guiding groove along the straight portion and against the outside of the guiding groove along the portion in the form of a circular arc, they switch direction of rotation in the groove when passing from the straight portion to the portion in the form of a circular arc and vice versa. This results in extra friction and wear.

It will also be appreciated that the loop formed by the driving belt may have an optional shape. However, a straight portion must be available to provide a sufficient welding distance.

According to one more alternative, the guiding groove is replaced by a guide rail or guide plate, which extends in parallel with and at a given distance from the driving belt. In this case the carriage is provided with ball bearing wheels rolling on the guide rail. Preferably, the carriage has two running wheels which are arranged one at each end of the carriage body and run on one side of the guide plate, and an abutment wheel, which is arranged centrally on the carriage body and runs on the opposite side of the guide plate. This construction will, however, be relatively expensive.

Figure 4:
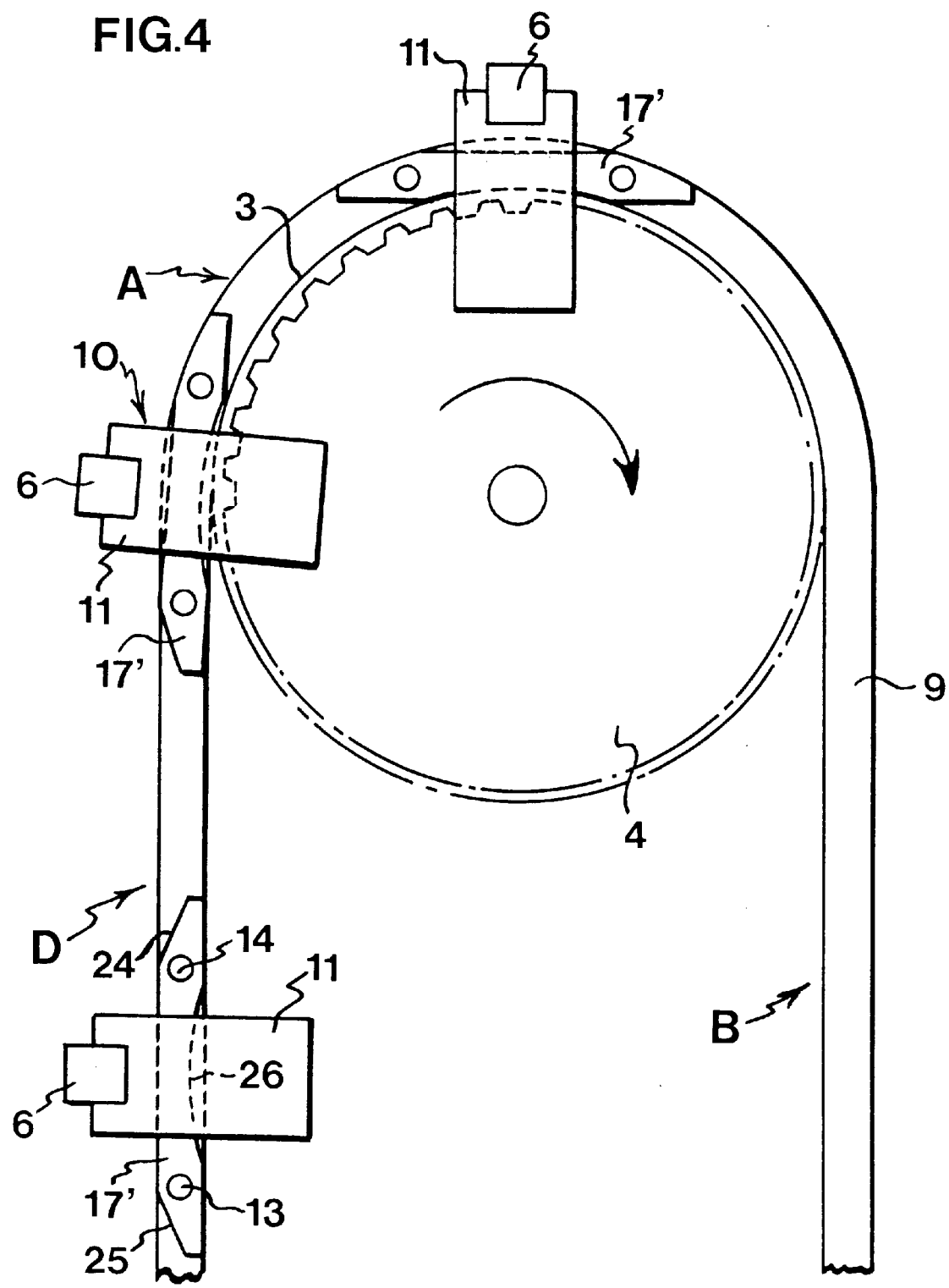
FIG. 4 is a side view of an alternative embodiment, a sealing jaw being shown in three positions during its circulating movement.

FIG. 4 shows an alternative embodiment, in which the sealing jaw 6 is shown in three positions during its circulating movement. The driver has, like the body of the carriage 10, been omitted in FIG. 4 for reasons of clarity. The carriage 10 comprises in this embodiment only one follower element 17', which consists of an elongate slide bearing received in the guiding groove 9 and rigidly connected to the carriage 10. The follower element 17', which can optionally be integrated with the carriage 10, has on its outside two abutment portions 24, 25 with a curvature corresponding to the curvature of the outer wall of the groove 9 along the portion A in the form of a circular arc. The follower element 17' has on its inside one more abutment portion 26 in the form of a recess with a curvature corresponding to the curvature of the inner wall of the groove 9 along the portion A in the form of a circular arc. The leading and trailing ends of recess 26 are spaced apart contacts which abut and move along the inner wall of the groove 9.

It will be appreciated that also in this case the carriage 10 and the guiding groove 9 will absorb the major part of the forces arising during the circulating movement of the sealing jaw 6. This arrangement also results in a displacement of the position of the sealing jaw in the radial direction along the portion A in the form of a circular arc and thus permits a soft mutual abutment of two sealing jaws 6 in the upper part of the welding distance.

Alternatively, the follower element 17' can be without the abutment portions 24, 25, 26 designed as described above. In this case, the sealing jaw 6 will however have a distance, which is unchanged over the portion A in the form of a circular arc, to the driving belt 3, and therefore it will be more difficult to achieve soft abutment of the sealing jaws 6 in the upper part of the welding distance.

Figure 5:
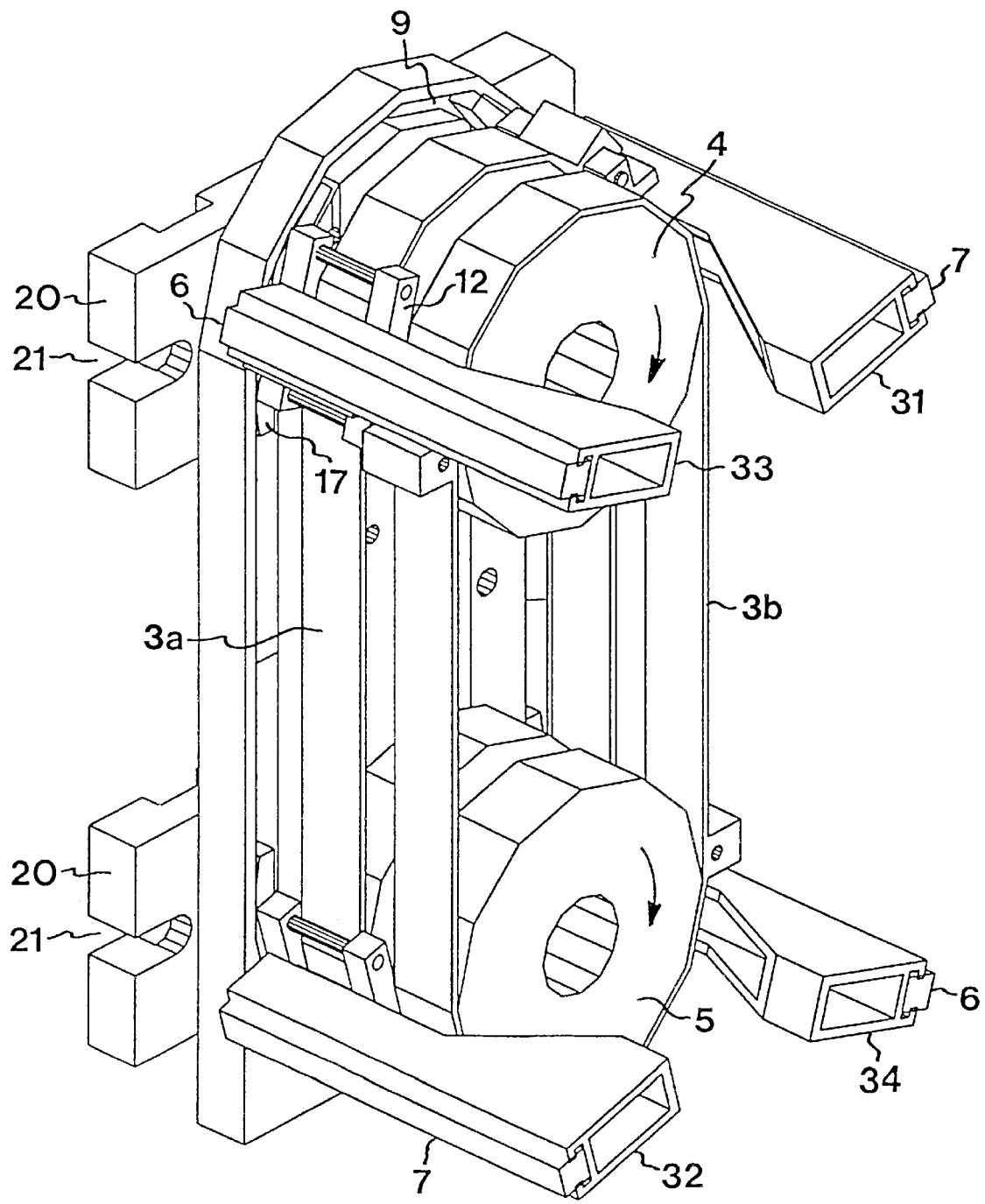
FIG. 5 is a perspective view of still another embodiment having two driving belts.

FIG. 5 is a view which corresponds to FIG. 3 and which shows still another embodiment of the invention. In FIG. 5, the plate 30 shown in FIG. 3 has been omitted for reasons of clarity. In this embodiment, the drive means 3 comprises two parallel driving belts 3a, 3b which are driven independently of each other by means of servomotors (not shown) connected to each of the two driving belts 3a, 3b via either of their associated drive wheels 4, 5. The inner driving belt 3a carries two sealing jaw holders 31, 32 corresponding to the holder 11 shown in FIG. 3, and the outer driving belt 3b carries corresponding sealing jaw holders 33, 34. In practice, a plate (not shown) corresponding to the plate 30 illustrated in FIG. 3 is arranged outside the outer driving belt 3b.

When welding is to be carried out, the two pairs of sealing jaw holders 31, 32 and 33, 34, respectively, start at the same time. The two holders 33, 34 stop when the holder 33 has reached the position of the holder 31 in FIG. 5. The holders 31, 32 stop when the welding is completed, that is when the holder 31 has reached the position of the holder 34 in FIG. 5.

The arrangement of the two parallel, independently driven driving belts 3a, 3b confers a particular advantage in that the distance between the weld lines on the web can be shortened, which means that shorter bags can be produced. The distance over which welding takes place can be doubled for the same bag length which is a clear advantage.

What we claim and desire to secure by Letters Patent is:

1. A welding unit for forming weld lines in an elongate web, comprising: a drive means which is arranged in an endless loop; at least one sealing jaw which is connected to said drive means for movement along said loop; a guide means extending in an endless loop essentially in parallel with said drive means; and at least one carriage which is connected to said drive means, said carriage having follower means which is adapted to abut against and move along said guide means; each carriage supporting a sealing jaw; said guide means having an arcuate portion and a straight portion; said follower means having two spaced apart contacts which abut and move along said guide means; said contacts being spaced apart a suitable distance to provide a soft abutment of said sealing jaw with another sealing jaw as the distance of said sealing jaw from said drive means gradually increases when the contacts pass from the arcuate portion to said straight portion of said guide means.

2. A welding unit as claimed in claim 1, wherein each carriage has on each side thereof at least two follower means which are fixed to said carriage at a fixing point, each, said sealing jaw being arranged between said fixing points.

3. A welding unit as claimed in claim 2, wherein said sealing jaw is arranged in a plane centrally between said fixing points of said follower means.

4. A welding unit as claimed in claim 1, wherein said drive means is an endless driving belt.

5. A welding unit as claimed in claim 1, wherein said guide means is a groove extending along said drive means and adapted to receive said follower means.

6. A welding unit as claimed in claim 1, wherein each follower means is a slide bearing which is turnably mounted on said carriage.

7. A welding unit as claimed in claim 1, wherein said drive means has a driver, which is adapted to abut against said carriage on a pulling side thereof.

8. A welding unit as claimed in claim 7, wherein said driver is turnably connected to said carriage.

9. A welding unit as claimed in claim 7, wherein said follower means at said fixing points are each mounted on a spindle connected to said carriage, one of said spindles extending turnably through said driver.

10. A welding unit as claimed in claim 1, wherein said carriage has, on each side thereof, only one follower means having abutment portions adapted to follow said guide means.

11. A welding unit as claimed in claim 1, wherein said drive means comprises two parallel endless driving belts which are driven independently of each other and each of which has at least one sealing jaw.

12. A welding unit as claimed in claim 1 wherein said follower means includes two spaced apart follower elements, one of said contacts being located on each of said follower elements.

13. A welding unit as claimed in claim 1 wherein said follower means includes a follower element, said two spaced apart contacts being located on said follower element.

14. A bag-making machine for forming weld lines in an elongate web, comprising: at least two opposite and cooperating welding units, each of which includes the following: a drive means which is arranged in an endless loop; at least one sealing jaw which is connected to said drive means for movement along said loop; a guide means extending in an endless loop essentially in parallel with said drive means; and at least one carriage which is connected to said drive means and has at least one follower element, which is adapted to abut against and move along said guide means; each carriage supporting a sealing jaw said guide means having an arcuate portion and a straight portion; said follower means having two spaced apart contact which abut and move along said guide means; said contacts being spaced apart a suitable distance to provide a soft abutment of said sealing jaw with another sealing jaw as the distance of said sealing jaw from said drive means gradually increases when the contacts pass from the arcuate portion to said straight portion of said guide means.

* * * * *